US007783665B1

(12) United States Patent
Tormasov et al.

(10) Patent No.: US 7,783,665 B1
(45) Date of Patent: Aug. 24, 2010

(54) EFFECTIVE FILE-SHARING AMONG VIRTUAL ENVIRONMENTS

(75) Inventors: Alexander G. Tormasov, Moscow (RU); Stanislav S. Protassov, Moscow (RU); Serguei M. Beloussov, Singapore (SG)

(73) Assignee: Parallels Holdings, Ltd. (BM)

( * ) Notice: Subject to any disclaimer, the term of this patent is extended or adjusted under 35 U.S.C. 154(b) by 635 days.

(21) Appl. No.: 11/779,258

(22) Filed: Jul. 17, 2007

Related U.S. Application Data (63) Continuation-in-part of application No. 10/691,066, filed on Oct. 21, 2003, now Pat. No. 7,293,033, which is a continuation of application No. 10/401,636, filed on Mar. 27, 2003, now abandoned.

(60) Provisional application No. 60/367,951, filed on Mar. 27, 2002.

(51) Int. Cl.
G06F 17/30 (2006.01)
(52) U.S. Cl. .................. 707/783; 707/825; 713/165; 713/166
(58) Field of Classification Search ............... None
See application file for complete search history.

(56) References Cited

U.S. PATENT DOCUMENTS

| 5,313,646 | A | * | 5/1994 | Hendricks et al. ............ 1/1 |
| 5,706,510 | A | * | 1/1998 | Burgoon ...................... 1/1 |
| 5,724,578 | A | * | 3/1998 | Morinaga et al. ............ 1/1 |
| 5,832,527 | A | | 11/1998 | Kawaguchi |
| 5,905,990 | A | | 5/1999 | Inglett |
| 6,044,465 | A | | 3/2000 | Dutcher et al. |
| 6,260,040 | B1 | | 7/2001 | Kauffman et al. |
| 6,289,356 | B1 | | 9/2001 | Hitz et al. |
| 6,418,466 | B1 | | 7/2002 | Bertram et al. |
| 6,560,613 | B1 | | 5/2003 | Gylfason et al. |
| 6,571,245 | B2 | | 5/2003 | Huang et al. |
| 6,618,736 | B1 | | 9/2003 | Menage |
| 6,647,384 | B2 | | 11/2003 | Gilmour |
| 6,687,741 | B1 | | 2/2004 | Ramaley et al. |

OTHER PUBLICATIONS

Article: "Union Mounts in 4.4BSD-Lite" 9 pages Authors: Jan-Simon Pendry, Sequent UK; Marshall Kirk McKusick, (1995).
Article: 18.3.7—"Implementation Issues and Variations", 1 page, Design Techniques IV, p. 757, (1996).

(Continued)

*Primary Examiner*—Cam Y T Truong
(74) *Attorney, Agent, or Firm*—Bardmesser Law Group (57) ABSTRACT

A system, method and computer program product for sharing files among users of multiple Virtual Environments (VEs). Each VE user has private objects, such as files or directories, that contain links to selected shareable files or directories in a common memory storage area. Each VE user also has a private file area to store files. If a VE user wishes to access a shareable file to perform an action that does not modify the shareable file, then the VE user private file allows the VE user to access the sharable file in a common memory storage area. The VE user private file contains a metadata attribute specifying the link to the shareable file. If the VE user wishes to access a shareable file and perform an operation that modifies the shareable file, the system makes a copy of the shareable file and places the copy in the VE user's private file area.

18 Claims, 7 Drawing Sheets

OTHER PUBLICATIONS

Article: The Union Mount Filesystem, 1 page, (1996), Section 6.7, Stackable Filesystems, p. 235.

Article: "I/O System Overview", 2 pages, (1996), Chapter 6 pp. 236-237.

Article: "Design Overview of 4.4BSD", 4 pages, (1996), Chapter 2, pp. 36-39.

Article: "Local Filesystem", 12 pages, (1996), Chapter 7, pp. 242-253.

Article: "File Systems" 10 pages, pp. 401-410, (1997).

* cited by examiner

EFFECTIVE FILE-SHARING AMONG VIRTUAL ENVIRONMENTS

CROSS-REFERENCE TO RELATED APPLICATIONS

This patent application is a continuation-in-part of co-pending application Ser. No. 10/691,066, filed Oct. 21, 2003, entitled "System And Method For Providing Effective File-Sharing In A Computer System To Allow Concurrent Multi-User Access," which is a continuation of co-pending application Ser. No. 10/401,636, filed Mar. 27, 2003 entitled "System and Method for Providing Effective File Sharing in a Computer System to Allow Concurrent Multi-User Access," which claims priority to provisional patent application Ser. No. 60/367,951, filed Mar. 27, 2002 and entitled "Method of Using Links to Let Different Users Share a File Tree."

BACKGROUND OF THE INVENTION

1. Field of the Invention

The present invention relates to computer systems and, particularly, to a system and method for providing file sharing in a Virtual Environment (VE) to allow for efficient multi-user access.

2. Description of Related Art

Typically, the operating system of a computer includes a file system to provide users with an interface for working with data on the computer system's disk and to provide the shared use of files to several users and processes. Generally, the term "file system" encompasses the totality of all files on the disk and the sets of data structures used to manage files, such as, for example, file directories, file descriptors, free and used disk space allocation tables, and the like.

Accordingly, end-users generally regard the computer file system as being composed of files and a number of directories. Each file usually stores data and is associated with a symbolic name. Each directory can contain subdirectories, files or both. The files and directories are typically stored on a disk or similar storage device.

Operating systems such as UNIX, Linux and Microsoft Windows manage computer file systems by defining a file object hierarchy. A file object hierarchy begins with a root directory and goes down the file tree. The file address is then described as an access path, e.g., a succession of directories and subdirectories leading to the file. This process of assigning a file address is called access path analysis or path traverse. For instance, the path "I/r/a/b/file" contains the root directory (I), subdirectories "r", "a" and "b" and then the file.

Typically, the processes within an operating system interact with the file system with a regular set of functions. For example, these functions usually include open, close, write and other system calls or similar mechanisms. For instance, a file can be opened by the open functions and this function acquires the file name as a target.

The file system can also include intermediate data structures containing data associated with the file system to facilitate file access. This data is called metadata and may include, for example, data corresponding to the memory location of the files, e.g., where the file is located in the hard drive or other storage medium. For example, in the context of a UNIX operating system, these intermediate data structures are called "inodes," i.e., index-node. An inode is a data structure that contains information about files in UNIX file systems.

Each file has an inode and is identified by an inode number (e.g., i-number) in the file system where it resides. The inodes provide important information about files such as user and group ownership, access mode (read, write, execute permissions) and type. The inodes are created when a file system is created. There are a set number of inodes, which corresponds to the maximum number of files the system can hold.

Usually, computer file systems store this intermediate data concerning the location of stored files as separate structures in the same place as the file content is stored. The functions responsible for file searching, implemented in the operating system kernel, for example, first locate the intermediate data and then locate the file data that is sought. Directories can also have intermediate data structures containing metadata. File systems can also generate intermediate file data "on the fly", for example, at the moment when the file system is requesting the file. For instance, the NFS Network file system used by Sun Microsystems, provides for on the fly intermediate data creation.

In addition, intermediate data structures may include reference files or links that are associated with or point to other files. When a link is accessed, the link itself is not opened. Instead, only the file the link refers to is opened. Thus, the intermediate data structure in a link may contain data referring to other files that are not requested. For instance, the intermediate data structure may contain the path to another file that will be found and opened instead of this reference link.

There are several types of links or references. For example, references that include a symbolic name of another file are called "symbolic links." References that refer to another file's intermediate structure are called "hard links." The type of link used is generally determined by the operating modes supported by the operating system. File systems can provide several functions. As discussed above, the most basic task of a file system is to provide access to files. File systems can also enhance system performance with additional functions such as, for example, caching, access markers and fault-tolerance.

The multi-user operating mode of a computer system can generally allow the operating system processes of different users to operate simultaneously. Each process within the operating system is usually associated with information that identifies the user. For instance, in a UNIX system, this information is typically an identifier of the user and group on whose behalf this process is being executed. When accessing a file, the operating system defines the user requesting the file operation and determines whether the operation is permitted for that user.

Generally, this determination can be made upon opening the file, e.g., using a file access mechanism of the OS, such as requesting a function of the type "open." Thus, on the basis of this access information, the operating system can organize different views of the same file system tree based upon selected parameters, such as, for example, time, operation type or user information.

To unite different types of computer file systems, these file systems can be mounted. For any directory inside the file system, it is possible to mount another file system into that existing directory. Thus, one tree of the computer file system appears inside another file tree. The operating system uses a specific system call of the operating system kernel to mount a file system. This system call includes at least two arguments: the mounting point, e.g., the directory inside of the current file system, and the file system itself, e.g., the storage device or memory location where the data resides. Depending on the file system, additional information containing parameters of the specific file system types can be included.

During analysis of the access path to the selected data file, the operating system defines a moment when the path "passes" through this mounting point and "below" this point, an analysis is performed using operations specific for the given file system. The set of these operations is defined according to the parameters established during the file mounting process.

The UnionFS file system, developed in the FreeBSD UNIX operating system, implements a similar technique. One feature of UnionFS is that each user can have a different view of the tree of the same file. In order to provide this feature, two trees of the file system are built when mounting UnionFS. The first tree is a read-only tree. The second tree is created during the user's session and is used for auxiliary purposes. This second tree is defined as an additional parameter when mounting.

When calling a file within the shareable tree, a search is performed in two ways. First, the search can be based on a path name that is computed based on the location of the file. For example, the mounting point of UnionFS can be located at "a/b/u," and the file to be addressed can be at "/a/b/u/c/d/e." The second tree, mounted to the same point, is located starting from the address "/x/y/." Then an additional address is computed as "/a/b/u/c/d/e" minus "/a/b/u" plus "/x/y/." As a result, the additional address is computed as "/x/y/c/d/e."

Thus, the specific intermediate data structure (e.g., inode) is searched using the computed path name. If the specific intermediate data structure (inode) is found, then it is assumed that the file is found and the requested operation will be performed on this file. If the file is not found, then a second search by the direct address is provided. If the file is not found there either, the system returns the corresponding error code. Otherwise, the system acts according to the requested operation. If the file opens in response to an operation to modify its content or associated data, then the file is first copied to the computed address as described above, and the operation is performed on the new copy. Otherwise, the operation is performed on the file located in the shareable tree by the requested address.

One way to change the search address of the file object, and, accordingly, the position of the root file system for a group of processes, is to use a primitive that is analogous to the OS UNIX kernel primitive "chroot." The operation of this primitive is based on the principle of shifting the real root of the file system or "root" directory to some location for a selected group of processes, for instance, for all processes of one user. Then all file operations inside this process kernel are performed only within the sub-tree of the selected file system.

Another example of this type of system is one based upon "snaps" of the file system, or tree snapshots, in which modifications to the entire file system are chronologically arranged. All modifications made in the file system or any of its parts during a period of time are saved in a separate tree of the file system. Such separate chronologically arranged trees represent the complete history of file system modifications for a discrete period of time. Thus, to determine the file state at a fixed moment of time, the operator searches for the file in the most recently accessed file tree. If the file is not located, then the previous tree is searched.

Similarly, the Mirage File System (MFS) from IBM, describes a system consisting of a number of trees and a specific file search mechanism that depends on the file type, extension and sequence of requests, among other parameters. One of the principles of this computer file system is the substitution of the file search path whereby the search path is expanded to other file system locations associated with the file object being searched. For example, this system offers an implementation of a system of snapshots.

U.S. Pat. No. 6,289,356 also describes an example of implementation of specific intermediate data structures, in which the file system is organized with a strictly regulated mode of modifications records. The disclosed system provides the transition of file system states so that at any moment of time the system is in the correct state. Additionally, the system creates snapshots of the file system through doubling an intermediate data structure (e.g., inode) without doubling the files themselves. The system also marks the files chosen to store data file blocks as belonging to some snapshot of the file system. This provides interference with file system functioning at the level of data distribution algorithms.

The industry trend of virtualization and isolation of computer system resources makes the task of file sharing more complex. A Virtual Environment, such as, for example, Virtual Machine (VM) or Virtual Private Server (VPS) is a type of an isolated Virtual Environments that run on the same physical machine simultaneously. Each VM/VPS instance accesses its own files, as well as (in some cases) files used by other VMs/VPSs.

Virtualization allows running a number of VMs/VPSs on the same physical machine or processor. Thus, sharing file data among numerous Virtual Environments executed on the same machine becomes even more crucial. A robust file sharing system is especially important in multi-user systems, such as, for example, virtual server systems. A VPS is a server, for example, a Web server, that shares computer resources with other virtual servers.

Instead of requiring a separate computer for each server, dozens of virtual Web servers can co-reside on the same computer system. In most cases, performance is not affected and each web site behaves as if it is being served by a dedicated server.

In addition to maintaining efficient allocation of resources, providing multi-user access in Virtual Environment involves other considerations as well, including security, avoiding file corruption and maximizing system efficiency. Accordingly, it is desirable to provide a file system for Virtual Environments that provides multi-user access while avoids the danger of file corruption, provides security, allows scalability and facilitates the efficient use of limited system resources.

SUMMARY OF THE INVENTION

The present invention relates to a system, method and computer program product for providing file sharing between Virtual Environments (VE) executing on a single computing system to allow for efficient multi-user access, that substantially obviates one or more of the disadvantages of the related art.

More particularly, in an exemplary embodiment, a file sharing system includes an operating system; a plurality of Virtual Environments (VEs) running under the operating system; at least one shareable file that is accessible to a plurality of VE users, wherein each sharable file is stored in a common file storage memory of the computer system; at least one private file area associated with one of the plurality of VE users, wherein the private file area stores a file that is not available to other users of the computer system; and at least one VE user private file.

The user private file comprises at least one link, wherein each link is associated with a corresponding sharable file in the common file storage memory, such that the VE user private file points directly to the corresponding sharable file in the common file storage memory in response to a request to access a file. The VE user private file comprises metadata. The metadata comprises a link attribute and/or data associated with the VE user. The metadata allows the user to access a selected shareable file without copying the selected shareable file into the private file area. The VE user private file is populated with links corresponding to shareable directories and/or the shareable files. At least one VE user private directory contains at least one link that is associated with a sharable directory. The private file area is associated with a selected subset of the plurality of VE users. The selected subset of the plurality of VE users is associated with the Virtual Private Server.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

In the discussion herein, the following definitions are used:

VE—a type of environment that supports program code execution, where at least a part of the real hardware and software required for running program code are presented as their virtual analogs. From the point of view or the user, that the code in VE runs as if it were running on the real computing system.

VPS—Virtual Private Server (or VE), is one type of a Virtual Environment (VE) running on the same hardware system with a shared OS kernel and most of the system resources, where isolation of Virtual Environments is implemented on the namespace level. A Virtual Private Server (VPS) is a closed set, or collection, of processes, system resources, users, groups of users, objects and data structures. Each VPS has an ID, or some other identifier, that distinguishes it from other VPSs. The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions is desirable, as if the VPS were a dedicated remote server, with the existence of the VPS being transparent from the perspective of both the VPS user and the VPS administrator.

VM—a type of an isolated Virtual Environments running on the same physical machine simultaneously. Each Virtual Machine instance executes its own OS kernel. Support of Virtual Machines is implemented using a Virtual Machine Monitor and/or a Hypervisor. An example of a VM is a VMware Virtual Machine or a Parallels Software International Virtual Machine.

Hypervisor—control software having the highest privilege level for administrating hardware computer resources and Virtual Machines. One embodiment of the Hypervisor is used in the Xen open source project and virtualization for Windows Server "Longhorn" (Veridian).

The present invention relates to a system and method for providing file sharing in a Virtual Environment (VE) to allow for efficient multi-user access. Virtual Environments (VE), as discussed herein, can be any of a Virtual Private Server, a Virtual Machine, a Hypervisor-based Virtual Machine, and a Lightweight Hypervisor-based Virtual Machine, a session of Terminal Server Windows 2003 (or older) and a session of Citrix Presentation Server, Lightweight Hypervisor-based Virtual Machines, VMM-based VMs or hypervisor-based VMs. Each VE provides a set of services to local and remote users. A Virtual Environment, such as, for example, Virtual Machine (VM) or Virtual Private Server (VPS) is a type of an isolated Virtual Environments that run on the same physical machine simultaneously. Each VM/VPS instance accesses its own files, as well as files used by other VMs/VPSs.

In particular, the present invention includes the use of links or pointers to allow multiple users to access a common system file tree, including files relating to the operating system configuration and user services. Accordingly, every user can modify its files, independent of the access time and the presence or absence of other users, such that the modifications are only visible to the user who changes the file. In the detailed description that follows, like element numerals are used to describe like elements illustrated in one or more of the figures.

Physical users can generally be of two types, remote users and local users. In case of Virtual Environment, for example, Virtual Private Server (VPS), the users are usually remote users of the server. However, these users can be local users of a computer system. Each physical user has a user ID, which is associated with a set processes and permissions to access files. Multiple physical users (both local and remote) can be simultaneously logged into a VPS (or an OS of a computer) and share files residing on the physical machine, where the VPS is executed. In one of the embodiments, a method for sharing common files among multiple Virtual Environments (VE) is provided. Each VE can have multiple physical users who indirectly access sharable common files.

Figure 1:
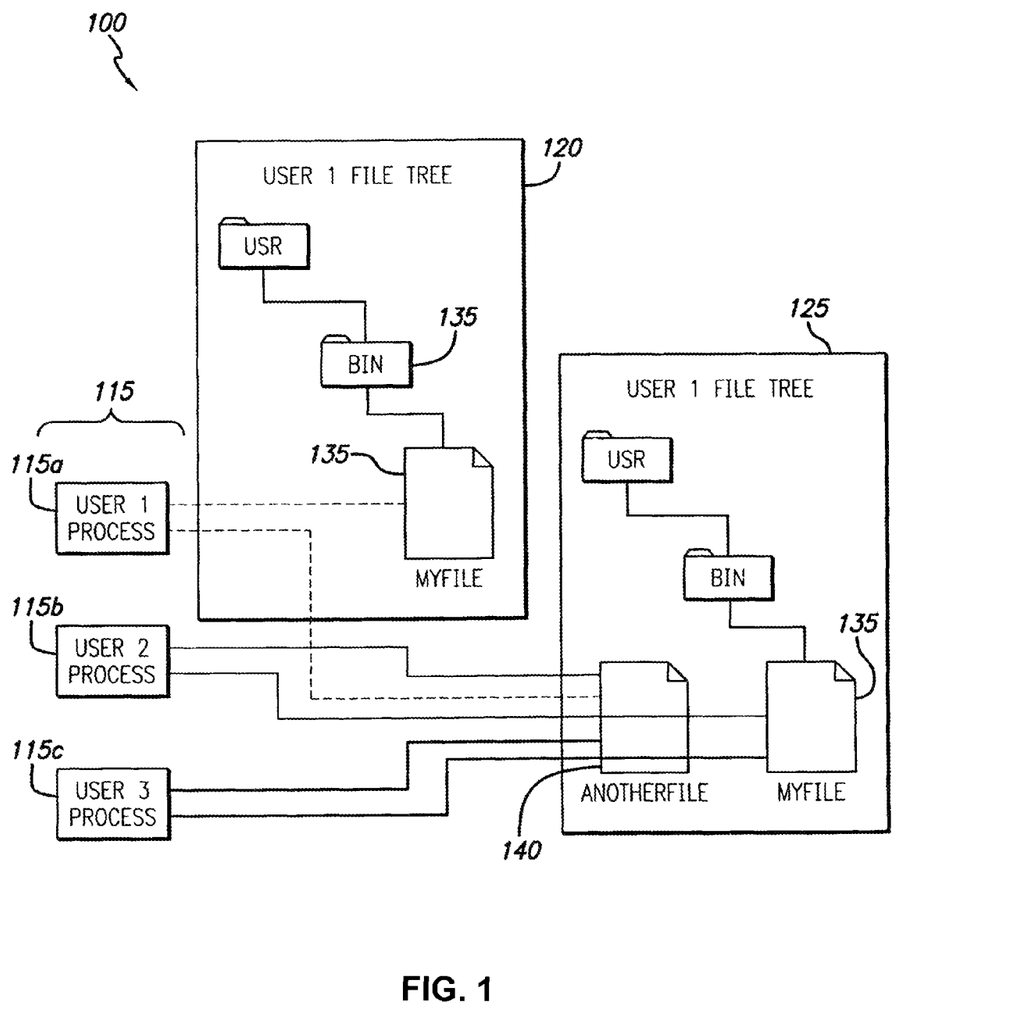
FIG. 1 illustrates file visibility to different users in an exemplary embodiment of the computer system.

As discussed above, the present invention is directed to a system and method for accessing a common file system associated with a computer system that provides for multi-user access. FIG. 1 illustrates an exemplary embodiment of the computer system of the present invention, indicated generally at 100, and user access thereto. Computer system 100 includes a shared file tree 125 that is associated with the files that may be shared or accessed by the users of computer system 100. Computer system 100 allows for multiple users 115a-c, referred to as Users 1, 2 and 3, respectively.

Although three users are depicted in FIG. 1, it should be understood that computer system 100 can be configured to accommodate more users. Each user 115 has access to the shareable file tree 125. Accordingly, each user can share the file tree 125 to provide multi-user access of the file system of computer system 100.

In addition, each user 115 is associated with a user file tree 120. Each user 115 can access shareable file tree 135 via its own copy of user file tree 120. From the user's point of view, user file tree 120 is transparent and tracks the structure of shareable file tree 125, as discussed below. As a result, user file tree 120 allows each user 115 to access files located in shareable file tree 125, including files relating to operating system configuration and user services. Each user file tree 120 is private and preferably may not be accessed by other users without administrative privileges.

Accordingly, as discussed below, every user 115 is able to modify its files independent of the other users. As a result, any user 115 is able to access and modify a file regardless of when other users are present on the system or access the file. These modifications to a file are only visible to the user that authored the changes. For example, as shown in FIG. 1, the file entitled "myfile," shown at 130, has a file path "/usr/bin/myfile" on shareable file tree 125. If User 1, shown at 115a, accesses myfile 130 via file path /usr/bin/myfile and modifies this file 130, then the other users, e.g., users 115b and 115c, that access myfile 130 via this same path, e.g., /usr/bin/myfile, only see the original, unchanged file 130.

The modified file, shown at 135, is only visible to the user that authored the modified file, e.g., User 1, and may only be accessed via file tree 120 of User 1. Similarly, other files that have not been changed will be visible to all users in its original form. For example, "anotherfile," shown at 140, has not been modified by User 1. Accordingly, all users 115 that access the file via the file path 1usr/bin/anotherfile will access the file from shareable file tree 125 and view the same, unaltered, file. As a result, multiple users may access and modify shared files without the risk of corrupting the original files.

In conventional multi-user computer systems, restricting access to modified files to the author is generally implemented through directly copying the file system tree for each user. But this solution requires a great deal of overhead to accommodate multiple copies of the same files for each different user. As a result, this conventional solution is not always possible or efficient due to the additional storage and processing requirements and the adverse effect on system performance.

In contrast, as discussed below, the present invention utilizes specific link files or pointers to provide multi-user access while minimizing the risk of file corruption. Generally, as discussed above, a link is a specific file type that serves as a reference to other files. Accordingly, upon receiving a request, the link or reference file readdresses the request to another file. Thus, when a link is accessed, the link itself is not opened, but rather, the file the link refers to is opened. Thus, the intermediate data structure in a link may contain data referring to other files that were not requested. For instance, the intermediate data structure may contain the path to another file that will be found and opened instead of this reference link.

Figure 2:
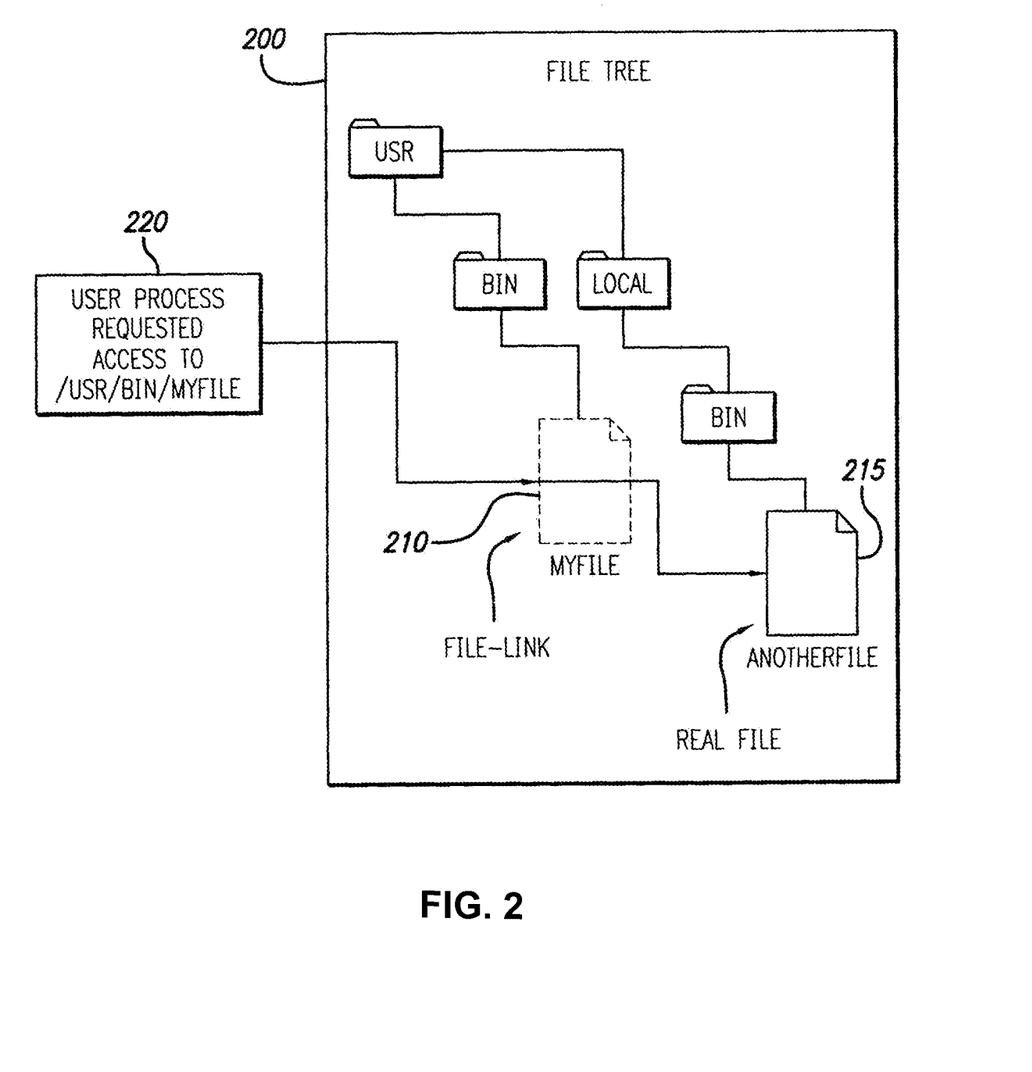
FIG. 2 illustrates requested access to a non-link file in accordance with an exemplary embodiment.

For example, in reference to FIG. 2, "myfile" 210, located at path /usr/bin/myfile in file tree 200, is a link file that points to "anotherfile" 215. Accordingly, if user process 220 attempts to open myfile 210, the process will instead open anotherfile 215. The operation of a link file is generally transparent to the user. Thus, a user will not be able to determine that the file is in fact a link file, rather than the actual file the user is attempting to open, absent a specific request, if at all.

Figure 3:
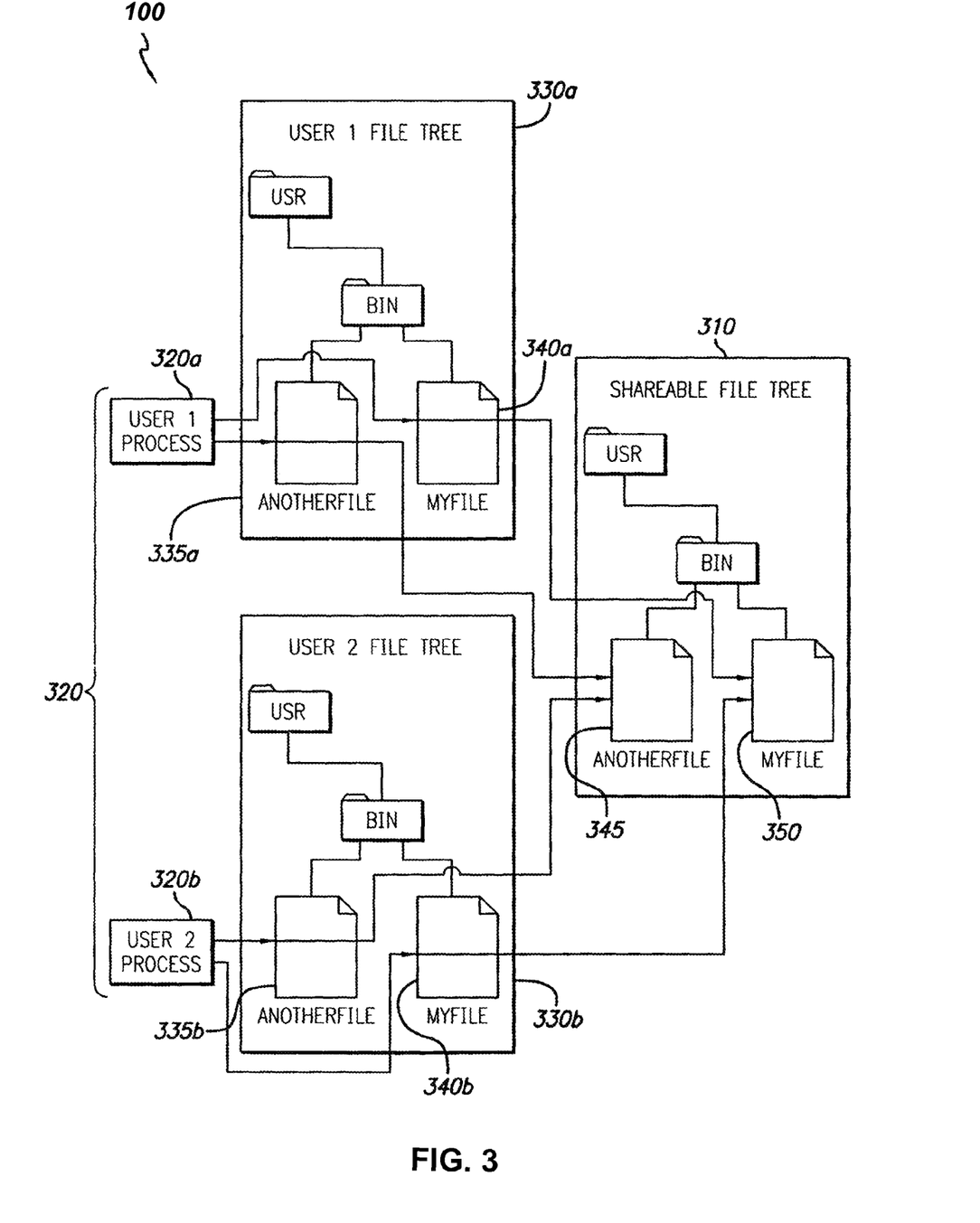
FIG. 3 illustrates the initial state of the user file area in accordance with an exemplary embodiment.

FIG. 3 shows an exemplary embodiment of the computer system of the present invention, shown generally at 100. As discussed above, computer system 100 includes a shareable file tree, indicated at 310. In addition, computer system 100 allows multiple users, shown at 320, to access shareable file tree 310. The multi-user mode of computer system 100 may generally allow the operating system processes of different users to operate simultaneously. Each process within the operating system is usually associated with information that identifies the user (i.e. user ID). When accessing a file, the operating system defines the user requesting the file operation and determines whether the operation is permitted for that user.

Generally, this determination may be made upon opening the file, e.g., requesting a function of the type "open." Thus, on the basis of this access information, the operating system may organize different views of the same file system tree based upon selected parameters, such as, for example, time, operation type or user information.

Each user 320 that has access to the computer system's shareable file tree 310 also has its own user file tree 330 that contains a directory structure analogous to the shareable file tree 310. But instead of containing a copy of the actual file residing in shareable file tree 310, user file tree 330 contains a link to the corresponding actual file in shareable file tree 310. For example, initially, files 335a and 340b are not copies of the analogous files in shareable file tree 310, files 345 and 350, respectively. Instead, files 335 and 340 are link files to actual files 345 and 350.

Accordingly, each user 320 accesses the actual file through its user file tree 330, which, in turn, links to the actual file in the shareable area. From the user's point of view, this operation is implemented transparently—the user 320 cannot see the location to which the link or pointer is directed when it addresses a file. In an alternate exemplary embodiment, the user may discover the actual address of the actual file or link only if such feature is specifically provided by the operating system.

Figure 4:
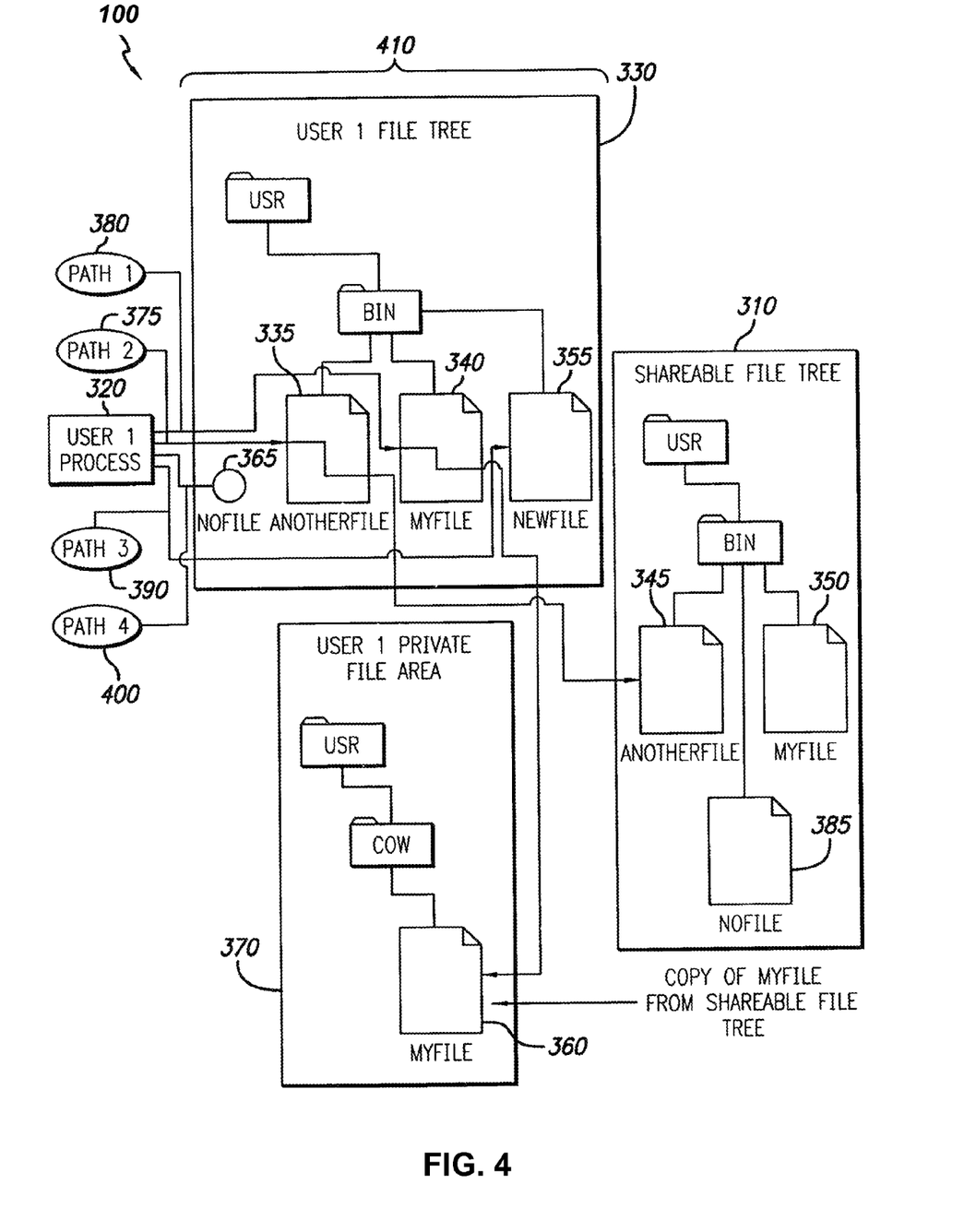
FIG. 4 illustrates an exemplary embodiment of the user file area.

FIG. 4 shows another exemplary embodiment of the present invention. Computer system 100 includes a shareable file tree 310. Shareable file tree 310 includes several shareable files, including "anotherfile" 345 and "myfile" 350. System 100 also includes a user file area 410. Each user 320 has access to its own user file tree 330 that may be located in user file area 410. As discussed above, user file tree 330 contains files that correspond to files in shareable file tree 310. Accordingly, user file tree 330 includes "anotherfile" 335 and "myfile" 340 that correspond to files 345 and 350 in shareable file tree 310, respectively. However, user file tree 330 does not contain copies of the corresponding files in shareable file tree 310, it only contains links. Accordingly, until the user attempts to modify the files, as discussed below, files 335 and 340 are initially links to actual files 345 and 350.

Generally, all file operations may be subdivided into two categories: (1) operations that modify the file content or its associated data; and (2) all other operations, e.g., operations that only access the file. If the user process 320 does not request a file operation that modifies the file contents of a file located in shareable file tree 310, system 300 unconditionally opens the file pointed to by the link. For example, as shown in FIG. 4, user 310 can request to access, and not modify, anotherfile 345. As shown by Path 2, indicated at 375, user 310 will open anotherfile 335, the link to the actual anotherfile 345, and be permitted to access this actual file 345. Further operations with anotherfile 345 may be subsequently performed as usual.

On the other hand, if the user operation attempts a modification of any information parameters associated with the file, e.g., its content or length, then system 300 first defines the link points, e.g., to the original file in shareable file tree 310, or elsewhere. In order to allow users to modify file system data, each user receives its own private file area, indicated at 370 in FIG. 4, that may be located in the user file area 410.

Private file area 370 may be a selected memory or storage location in or accessible to system 300. In the event that a user 320 wishes to perform an operation that modifies a shareable file in shareable file tree 310 for which the user's file tree 330 contains a link that points to this shareable file, system 300 first copies the shareable file into the user's private file area 370.

Next, system 100 modifies user file tree 330 so that the link associated with the shareable file no longer points to the location in shareable file tree 310, but instead points to the location of its copy in user's private file area 370. Thus, system 100 performs a user-transparent operation to allow a user to modify a shareable file without incurring the risk of sharable file corruption.

For example, as shown in FIG. 4, user 320 may wish to access and modify "myfile" 350 located in shareable file tree 310. Because user 320 wishes to modify the file, system 100 will not allow user 320 to directly access and modify the actual shareable file 350. Instead, system 100 will copy the shareable myfile 350 to the user private file area 370. As a result, private file area 370 now contains a copy of the original shareable myfile, shown at 360.

Next, system 100 modifies the associated link file, "myfile" 340, located in user file tree 330, to point to copy 360 instead of the original file 350 located in shareable file tree 310. As shown by Path 1, indicated at 380, instead of accessing the original file, user 320 will instead access the link file 340 to open the copy 360 stored in the user's own private file area 370. User 320 is now free to modify copy 360 as usual. Any modifications made to this copy 360 of myfile 350 by this user will not be viewable to other users of system 100.

Note that private file area 370 and user file tree 330 may be configured to be accessible to a selected set of users, e.g. a group of users associated with the underlying operating system, rater than just a single user. Note that user 320 may place files into private file area 370 that do not contain links, e.g., pointers to shareable file tree 310. Moreover, user file tree 330 may contain metadata to optimize user access. For example, the links located in user file tree 330 may contain metadata concerning the user's access to the corresponding shareable file. For example, the metadata may allow a user to define permission to files stored in the shareable file tree without copying the files into the private file area 370.

If the link file in user file area 330 already points to a file copy in private file area 370, then the operation will be performed on the copy without any change in user file tree 330. For instance, if user 320 wishes to continue modifying myfile copy 360, as discussed in the above example, then user 320 will access myfile copy 360 via myfile link 340, as shown by Path 1, indicated at 380. Therefore, any further operations with myfile copy 360 will also be transparent to user 320.

User 320 may also freely create new files within system 100. If a user 320 requests the creation of a new file, the new file will be created only in the specific private file area 370 or 410. For example, in the exemplary embodiment shown in FIG. 4, user 320, e.g., User 1, wishes to create a new file, e.g., a file not present in shareable file tree 310, entitled "newfile." System 100 preferably allows the user to create this new file, shown as newfile in 410, only in the user's own data area associated with user file tree 330.

Accordingly, user 320 can directly access newfile 355, e.g., via file path 1usr/bin/newfile, as shown by Path 3, indicated at 390. Thus, in a preferred exemplary embodiment, only the user that authored the new file may access or view the new file. In this example, newfile 355 is preferably not viewable to any other user, except User 1. In an alternative embodiment, system 100 can create the new file in the user private file area 370 and modify user file tree 330 to include a link file that points to the new file in user private file area 370. User 320 may now access the new file via the associated link in user file tree 330.

User 320 can also delete files within system 100. If the user requests an operation to delete a file that has a link pointing to the shareable data area, then only the pointer will be deleted. The original file and its associated data will be unaffected and accessible by other users. For example, in the exemplary embodiment shown in FIG. 4, user 320, e.g., User 1, wishes to delete the shareable file entitled "nofile" 375 located in shareable file tree 310. Instead of deleting the shareable file, system 100 will instead delete the corresponding link file, nofile 365, located in User 1's own file tree 330, as shown by Path 4, indicated at 400.

Once the link file 365 has been deleted, User 1 will not be able to view or access nofile 385, absent intervention by the system administrator, for example. Accordingly, from User's 1 point of view, nofile 385 has been deleted, even though it is still available to all other users. If the user requests deletion of a file that has a link pointing to a copy located in the user's private file area 370, then both the pointer itself and the file copy will be deleted. For example, if User 1 wishes to delete the modified "myfile" 360, then both the link file 340 and the copy 360 will be deleted.

If the user requests the deletion of a file that is not a pointer file and that is located in a specific private data area, e.g., private file area 370, then that file will be deleted as usual. As discussed above, a user's decision to delete a file will not affect another user's existing ability to access a file.

Figure 5:
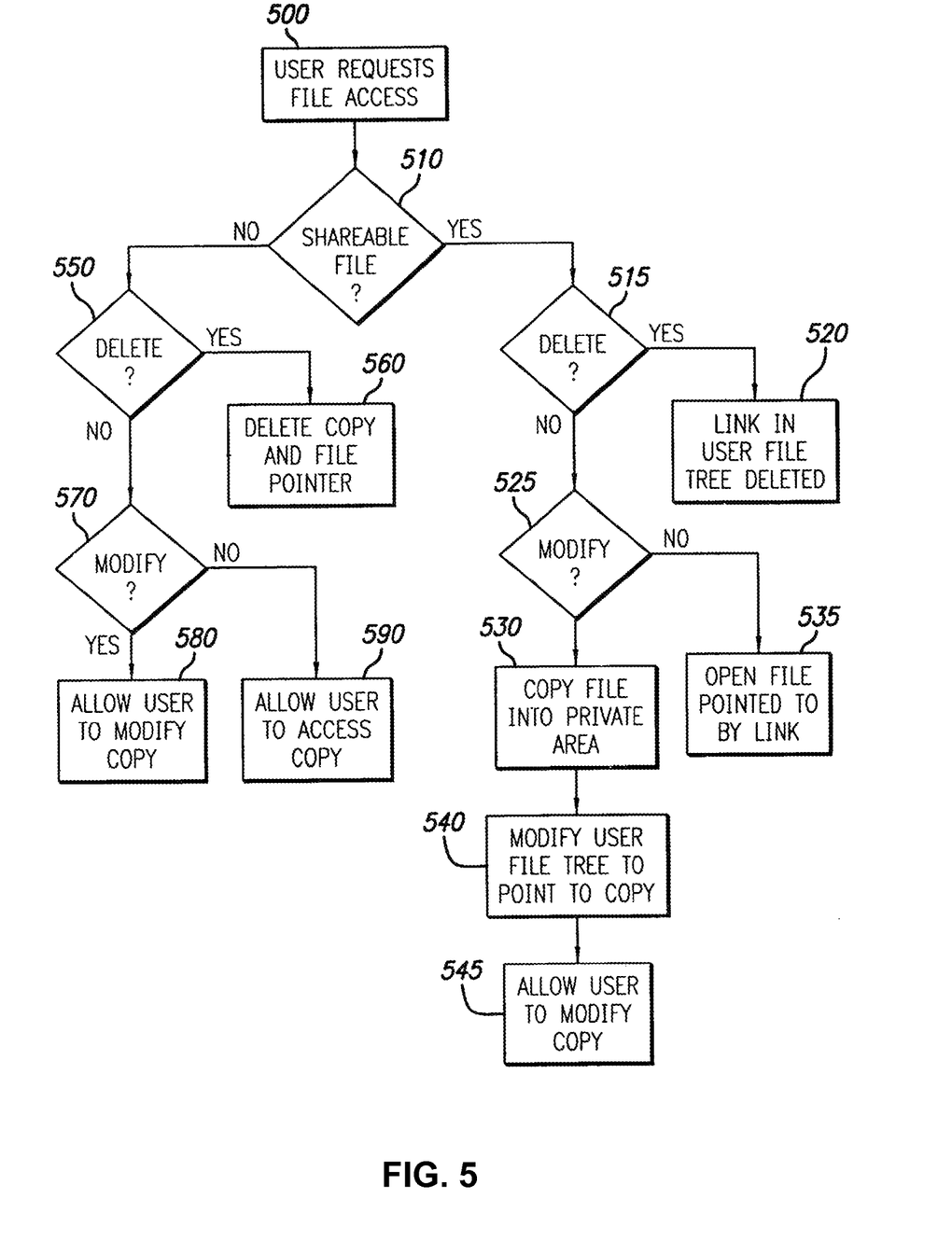
FIG. 5 illustrates an exemplary embodiment of the proposed method.

FIG. 5 illustrates an exemplary embodiment of the method of the present invention. At step 500, the system receives a user request to access a file. At step 510, it is determined whether the requested file is a shareable file located in the shareable file tree or a private file. If it is determined that the file is a shareable file, then, at step 515, it is determined whether the user wishes to delete the file.

If so, then the link to this file located in the user's file tree is deleted—not the shareable file—at step 520. Otherwise, it is determined at step 525 whether the user wishes to modify the shareable file. If not, then at step 535, the user may access the shareable file via the user file tree. On the other hand, if the user wishes to modify the shareable file, then the system copies the shareable file to the user's private file area, at step 530, modifies the user file tree to point to this copy, at step 540, and then allows the user to modify the copy (not the original shareable file) at step 545.

If it is determined at step 510 that the user wishes to access a private file, then it is determined at step 550 whether the user wishes to delete the private file. If so, the system deletes both the file copy and any associated pointer file. If the user merely wishes to modify the file, at step 570, then the system allows the user to directly modify the private file at step 580. On the other hand, if the user only wishes to access the file, then at step 590, the user is allowed to access the private file.

The system and method of the present invention manages access such that all modifications made by one user in any file of the shareable file tree 310 are independent from the actions of other users and are visible only to the user making the modifications. As discussed above, file manipulation is implemented in the operating system by utilizing links in the file system. Generally, access to files in a file system is provided through specific intermediate data structures, e.g., inode. These intermediate data structures contain information associated with the file, such as, for example, where the file data may be found on the disk or the time of the last file modification.

As discussed above, in order to provide this type of access, the computer system creates two directories for each user: a first directory to repeat the structure of the shareable tree to store links to files, e.g., user file tree 330, and a second directory to store files copied from the common area, e.g., private file area 370. In one exemplary embodiment, these directories are implemented using a mounting system call that has the required directories as a parameter. During analysis of the access file path, the system will determine when the access path passes in the sub-tree accessible through the mounting point. The appropriate software then controls access to the files inside the directory.

Thus, when searching for a file via the access path, an analysis of the access path is initially provided and the algorithm determines whether this path intersects any mounting point. If the path intersects the mounting point of the described file system, the processing is performed according to the principles described above.

Therefore, the algorithm determines the address within its own private tree of the file system and searches for an intermediate data structure used to access an object. If the structure is not found, the file is considered absent. If the structure is found, then that structure is used to determine the type of file object, and, depending on this type of file object, the algorithm either enables operation on the data pointed to with the file, or provides readdressing to another file, if the file is a link file. If at least one of those structures is not located, the file is considered to be absent.

As discussed above, similar data structures can be created "on the fly" during interaction with the file system. In this case, these structures are stored only in the random access memory of a computer or in its cache, rather than on the hard drive or similar storage device. For example, those structures created on the fly may be stored in the temporary buffer data area on the disk or in RAM, or any other similar memory location.

In another embodiment a method for sharing common objects (i.e. files and directories) among multiple Virtual Environments (VEs) is provided. VE users can modify, update, replace and delete shared objects. When a VE user modifies a shared file, the system creates a private copy of the file transparently for the user. Thus, file modification do not affect the other VE users.

Figure 6:
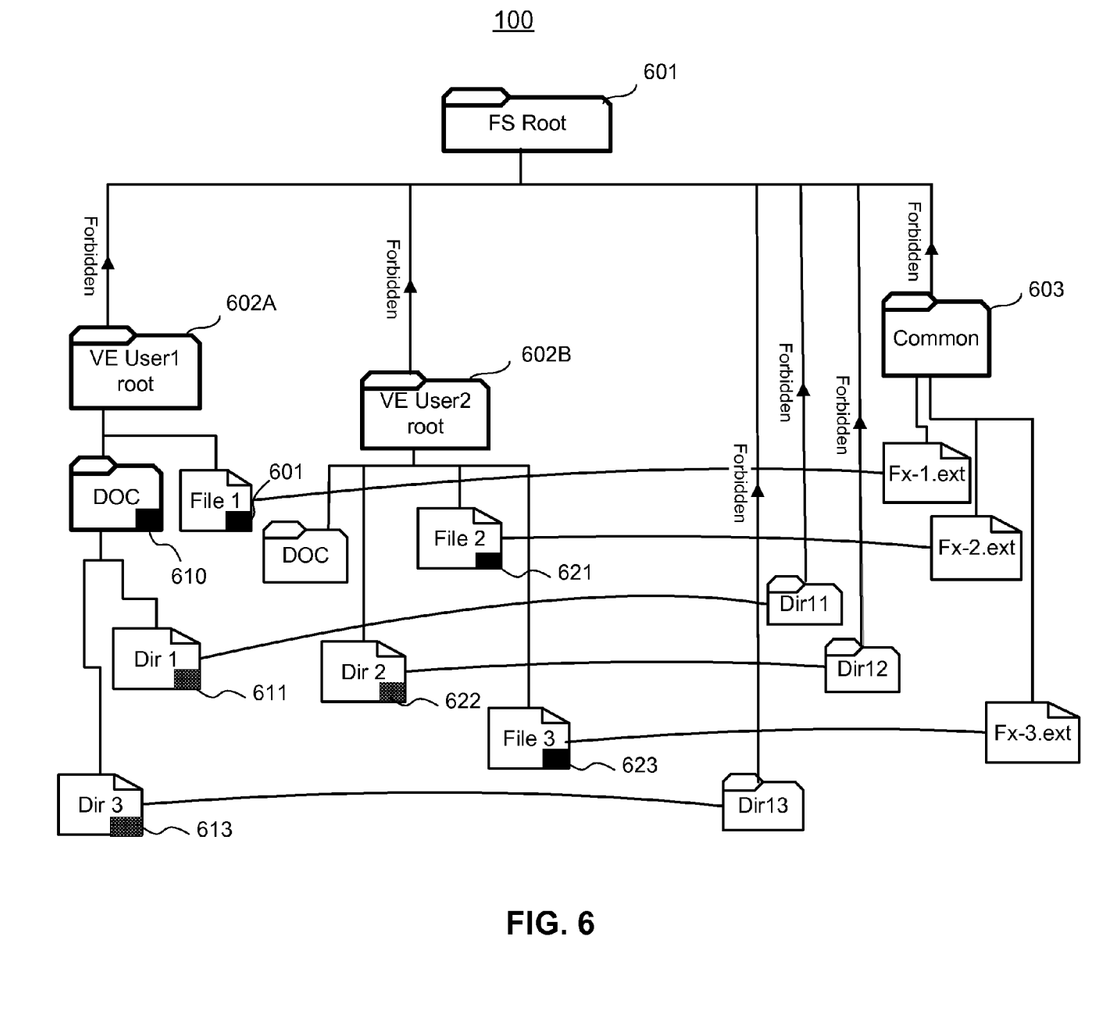
FIG. 6 illustrates an exemplary embodiment for file sharing among users of multiple VEs.

An exemplary computer system 100 for sharing common files among VEs is illustrated in FIG. 6. The file system having a root directory 601 is located at a physical level of a computer system 100. Common files 603 are shared by VE users 602A and 602B. Unlike a conventional file sharing model, the proposed system does not allow to access sharable files 603 through the file system root directory 601, which requires calculating the file path. Instead, files and directories in a shared area 603 are accessed via links contained in the files and directories of the VE user's private area. The links contained in the files or directories are defined by a special metadata attribute.

In the example depicted in FIG. 6, VE Users 1 and 2 access objects, such as files and directories, within their own private root directories 602A and 602B. The files and directories of the private root directories 602A and 602B contain links to files and/or directories of the shared area 603. The link related metadata attributes 601, 610, 611, 613, 621, 622, 623 within the private files and directories are illustrated by black squares. For example, when VE User 1 accesses the file File 1, the metadata attribute 601 specifies if the file is a data file or a link to a file in the shared area 603 is read.

If the file metadata attribute 601 specifies that the file is a link, the file data portion is not open and the file Fx-1.ext, to which the link refers to, of the shared area 603, is accessed. This file can have any type of extension (such as, for example, ".txt", ".exe", ".mpeg", ".jpeg," etc.—a genetic extension ".ext" is used in the figure). Likewise, VE User 2 can access the file Fx-2.ext via the link File 2 having metadata attribute 621. The same access algorithm can be used with file directories. For example, VE User 1 can open the directory Dir 1 in the private root directory 602A and use the link defined by metadata attribute 611 to access the directory Dir 11 in the shared area 603. Note that links are created, deleted or modified by the file system and the VE users are not allowed to create, delete or modify the links. The VE users can see the links in the VE user's root private area, but user access to actual links and the link metadata within files or directories is blocked. This arrangement provides for effective file sharing among VE users without compromising integrity and security of the file system.

Dir 12 and Dir 13 are accessed the same way through the referring links contained in Dir 2 and Dir 3. Same works for file Fx-3.ext accessed by VE User 2 through the corresponding link File 3. Thus, the files and directories are accessed and shared by VE users indirectly through links Note that each file and/or directory in a VE user's root private area can have multiple links to files and/or directories in the common shared area. Directories in a private VE area can have links to directories and/or files in the common shared area, and files in private VE area can have links to files and/or directories in the common shared area.

The link files are files with a special metadata attribute and they are regular files when seen from hardware point of view. This arrangement provides for a faster and more efficient VE back up and restore process. Significant amounts of RAM and disc space are saved by the proposed embodiment. The embodiment also provides for increased security as VE users have no access to system file root directory. When VE users access the files form the shared area, they are not aware of the actual location of the file since the file path is hidden within the links. As discussed above, the VE users cannot access the metadata contained in the link files. Thus, VE back up process remains absolutely unaffected by the multiple VE users sharing files and directories.

In order to provide security and system integrity, it is preferable that the computer system limit the extent to which users may mark files, such as creating a specific mark. Generally, the creation and characteristics of a specific mark depends on the underlying file system. For example, for a Linux system, a special file flag, e.g., a sticky bit can be used as a specific mark because this flag is not used by standard file systems for symbolic links. In other file systems, e.g., Windows NTFS, for example, the system can use other techniques to mark files.

A specific mark may be a standard link or pointer of the underlying file system. For example, a specific mark may be a symbolic link in a Unix file system. In this case, a user can create its own symbolic links using standard as interface. These user-created links are distinguishable from the system's own pointers. But, if the system allows regular users (and not just system administrators) to create such links, the user can accidentally or intentionally create a link pointed to some critical system files that may compromise system security.

For instance, the user may create a link to a "/etc/shadow" file that contains encrypted passwords for the system. Accordingly, the system should not allow users to mark files accessed via "mounted" points. Therefore, these links should only be created at the direct access to the private user area by means of the underlying file system, and the access path should not contain the mounting point of the file system being described.

For example, the system should allow creation marks for files from "/vz/private" directory tree (see discussion of Virtuozzo™ below regarding the "vz" directories), but should not allow creation of such marks for files from the "/vz/root" directory tree.

Virtual Environments may be implemented as running on the same hardware system with a shared OS kernel and most of the system resources, where isolation of VEs is implemented on the namespace level. Software necessary for process execution is virtualized and provided to the process. A VE, such as a Virtual Private Server (VPS), is implemented in, for example, Virtuozzo™ OS virtualization solution, available from SWsoft, Inc., as a closed set, or collection, of processes, system resources, users, groups of users, objects and data structures. Each VPS has an ID, or some other identifier, that distinguishes it from other VPSs.

The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions is desirable, as if the VPS were a dedicated remote server, with the existence of the VPS being transparent from the perspective of both the VPS user and the VPS administrator.

Note that in an exemplary embodiment of the present invention, the chroot function may be used to move root file systems for a particular user or set of users into predefined locations and to prevent users from accessing unauthorized sections of the file system. Usually, the mounting point of the mentioned file system is used to provide access through utilization of the chroot primitive, e.g., the procedure of changing the root of the file system.

Functioning of the mounting point is based on the principle of shifting the file system real root or "root" directory to any selected location. For example, the root directory may be moved to the mounting point of the file system for a certain group of processes, such as, for instance, for all processes of a user. Consequently, all file operations associated with the user processes within the mentioned file system are handled with the transparent substitution of files, as discussed above.

As a result, the user then has no opportunity to explicitly create pointer files having specific marks as interpreted by the file system.

For example, in a VE, users can be restricted to use only a mounted tree, rather than the actual underlying file system. In this case, if the "chroot" function is applied to "/vz/root" for user processes, users will be unable to create such pointers because the file system will be accessed using "/vz/root." As discussed above, this is advantageous from a security point of view.

Note that, in one embodiment, the present invention does not require a mounting system call, but rather, the present invention may utilize mounting system calls in an exemplary embodiment of the invention. Moreover, the present invention does not require the creation of a mounting point when the user modifies a file (and creates a copy in its private file area). The file system can use a single mount point to combine two known file trees (such as, for example, "/vz/private" as a private area and "/vz/template" as a common shared read-only area) into a new, combined tree (for example, into "/vz/root" where all files from /vz/template and /vz/private appear from the user point of view).

Accordingly, to create such an area, the system may use a single mount call with these two trees as parameters. After the creation of this mount point, this combined tree will be usable by the user, and all access to files using this path (for example, to file "/vz/root/etc/passwd") will be handled by the file system driver because the path traverse operation will cross /vz/root/. All copy-on-write and other link-related operations will be performed by the file system driver and no additional mount operations are required.

To modify the content of the shareable area of the file tree so that all changes become visible to all users having access to the area according to the described schema, it is necessary to modify the above-mentioned shared tree, create specific links to the new files for all users of the system having their own private areas, and delete those links that point to non-existent files. It may also be necessary to create additional directories in these private areas.

For example, to make a change visible, the administrator or user itself should call a special procedure that will create such a link in the user private area. This link will point to the shared area, and typically it is transparent for the user. The special procedure may usually create a normal "standard" link on the underlying file system, and later mark it as a "magic" link using some special as interface implemented by a file system driver or OS kernel.

The present system and method provides a number of advantages over conventional file systems. For example, unlike the UnionFS file system discussed above, the present invention uses links instead of implicit computations of the new file address by its path. Moreover, in the UnionFS file system, a new file appearing in the shareable tree will become visible to all users at once. In the present invention, this file is invisible, because it explicitly creates a link to the new file for each user. Accordingly, among other advantages, the presently disclosed file system provides greater flexibility, simplifies maintenance and provides greater safety by avoiding the risk of file corruption, for example.

For example, if a single user makes a mistake during an upgrade procedure, all users under the UnionFS system will be adversely affected. In contrast, in the present invention, the harm may be minimized. Another advantage is that the present invention requires fewer calls. For example, to find a file in the UnionFS system, the system often must make two calls to open a file system call: one to the file in the private area and, in case of negative response, another one for the file in the shared tree. In contrast, the computer system of the proposed embodiment may use a single call because all redirection is made on the underlying file system driver level.

The preferred embodiment also provides a number of advantages over prior art file systems that require multiple searches or use system snapshots and record changes to different sub-trees at different times, such as MFS (Mirage File System). For example, the proposed embodiment utilizes links that allow the system to conduct a single search. Accordingly, the proposed embodiment utilizes less system resources, e.g., the proposed embodiment does not need to cache additional directory entries in a file system cache to deal with the additional file paths associated with system snapshots.

Moreover, the proposed embodiment does not use a full duplex of the structure of intermediate data structures of the file system tree and can work with the file system without formal inodes structures, such as, for example, the Linux journaling file system called "ReiserFS." Moreover, the proposed embodiment is not limited to operating at the level of the block data storage and the algorithms of data distribution on the disk, but, rather, at the level of files and pointers to those files. As a result, it is possible to use practically any underlying file system in the present invention.

Figure 7:
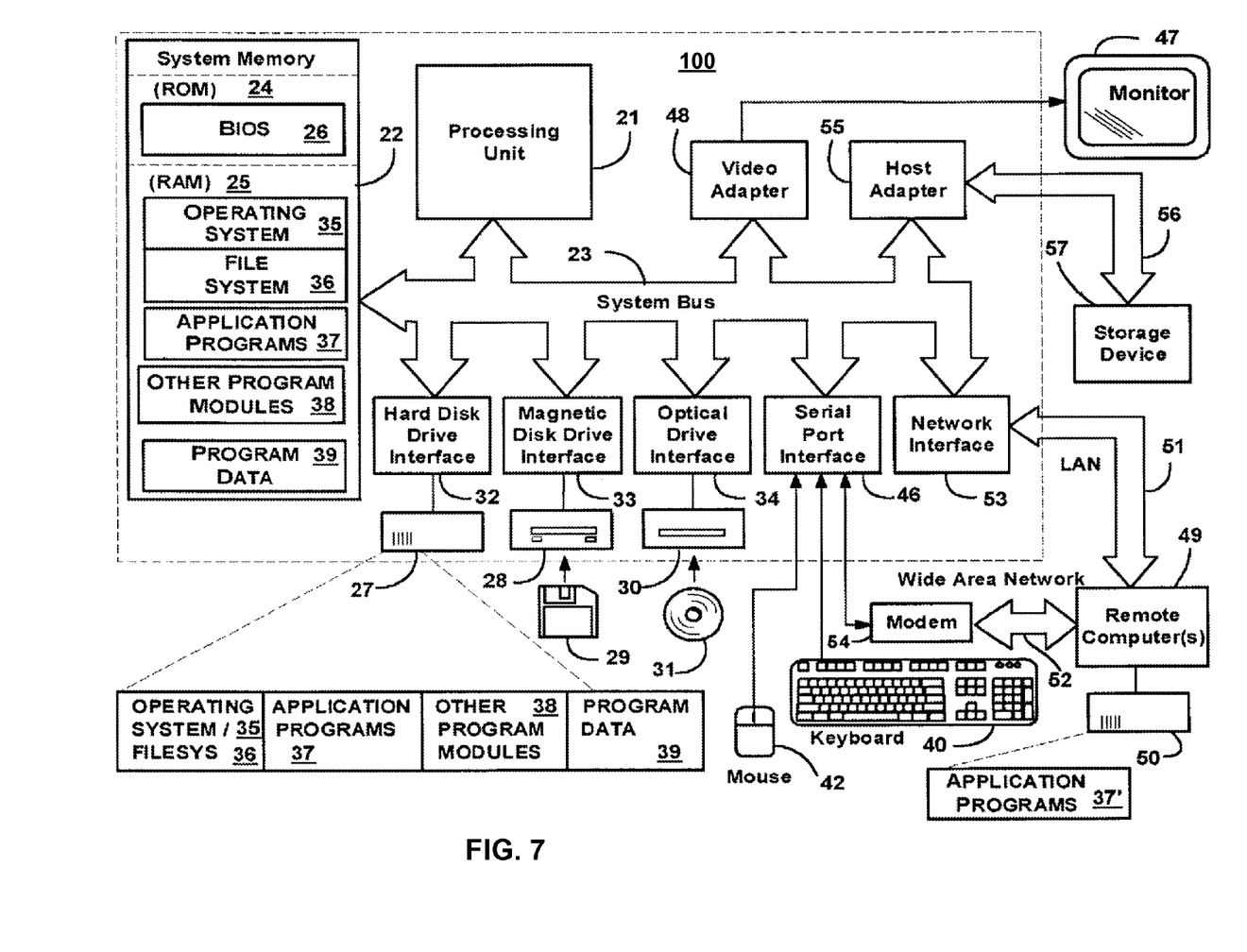
FIG. 7 illustrates an exemplary computer system on which the invention can be implemented.

With reference to FIG. 7, an exemplary system for implementing the invention includes a general purpose computing device in the form of a computer or server 100 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 100, such as during start-up, is stored in ROM 24. The computer 100 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 100. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 100 includes a file system 36 associated with or included within the operating system 35, such as the Windows NT™ File System (NTFS), one or more application programs 37, other program modules 38 and program data 39.

A user may enter commands and information into the personal computer 100 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

When used in a LAN networking environment, the personal computer 100 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 100, or portions thereof, may be stored in the remote memory storage device. It will be appreciated that the network connections shown are exemplary and other means of establishing a communications link between the computers may be used.

Having thus described a preferred embodiment of a system and method for providing file-sharing in a computer system to allow multi-user access, it should be apparent to those skilled in the art that certain advantages of the described method and apparatus have been achieved. In particular, it should be appreciated by those skilled in the art that system and method described in the preferred embodiment provide for a faster and more efficient VE back up and restore process. Significant amounts of RAM and disc space are saved by the proposed embodiment. The embodiment also provides for increased security as VE users have no access to system root directory. It should also be appreciated that various modifications, adaptations, and alternative embodiments thereof may be made within the scope and spirit of the present invention. The invention is further defined by the following claims.

What is claimed is:

1. A file sharing system comprising:

a processor;

a memory;

an operating system;

a plurality of Virtual Environments (VEs) running under the operating system, each VE contains at least one VE user process running locally on a computer system;

a file system containing objects comprising files and folders;

at least one dedicated private area in the file system associated with one VE of the VEs and accessible only from the one VE, each area containing at least one of the objects;

a plurality of mounting points in the file system, each mounting point providing a view of a shared area and a dedicated private area, each view containing at least one object of the file system;

at least one shared object in the file system that is accessible to a plurality of VE user processes through a plurality of views, wherein the dedicated private area of one VE user is not visible in the views of the dedicated private areas of other VE users; and at least one VE user dedicated private area includes an object containing reference data for redirection to contents of the shared object corresponding to the reference data, wherein:

when the VE user attempts to modify the shared object, the contents of the shared object is copied to user's private file area and the VE user modifies a corresponding private object instead, the reference data is hidden from the VE user process, the VE user private object is created and modified on an operating system level transparently to the VE user processes through the corresponding view of the VE user dedicated private area, the VE user's private file or directory file comprises metadata associated with the VE user that allows the VE user to access a selected shareable file without copying the selected shareable file into the VE user's private area; and the VE user private file is modified such that a link associated with the selected shareable file points to the copy of the selected shareable file located in the dedicated private area and the link is replaced by the copy of the selected shareable file to which it points.

2. The file sharing system of claim 1, wherein:

the private area further comprises a private folder containing the VE user private file pointing to a shared folder of the file system; and contents of the shared folder is visible as at least a part of a content of the private folder.

3. The file sharing system of claim 1, wherein the private folder has a file system attribute reflecting storing the VE user private file inside the folder.

4. The file sharing system 1, wherein the VE user private file pointing to the sharable file has a file system attribute reflecting storing a link inside the VE user private file.

5. The file sharing system 1, wherein contents of the shared folder, except for the shared object, is hidden from the user.

6. The file sharing system of claim 1, wherein the metadata allows the VE user to access a selected shareable file without copying the selected shareable file into the VE user private file area.

7. The file sharing system of claim 1, wherein the private file area is associated with a group of VE users and each VE user has access only to an associated private file.

8. The file sharing system of claim 7, wherein the group of VE users is associated with at least one Virtual Private Server.

9. The file sharing system of claim 1, wherein the VE user private file stores a file that does not contain a link to the shareable file.

10. The file sharing system of claim 1, wherein a host operating system runs as one of the VEs.

11. A method for providing access to shareable files objects in a Virtual Environment (VE) to a plurality of VE users, comprising:

activating a plurality of VEs on an operating system, each VE containing at least one VE user process running locally on a computer system;

creating a plurality of private files for each of the VE users;

activating a file system containing objects comprising files and folders, and at least one dedicated private area in the file system associated with a VE and accessible only from this VE, each area containing at least one of the objects, the file system including a plurality of mounting points, each mounting point providing a view of a shared area and of a dedicated private area, each view containing at least one object of the file system, the file system also including at least one shared object, file or directory that is accessible to a plurality of VE user processes through a plurality of views;

wherein the dedicated private area of one VE user is not visible in the views of the dedicated private areas of other VE users; and at least one VE user dedicated private area includes the shared object, file or directory containing reference data for redirection to contents of the shared object, file or directory corresponding to the reference data, wherein:

when the VE user attempts to modify the shared object, file or directory, the contents of the shared object is copied to user's private file area and the VE user modifies a corresponding private object, file or directory instead, and the link is replaced by the copy of the selected shareable file to which it points, the reference data is hidden from the VE user process, and the VE user private object, file or directory is created and modified on an operating system level transparently to the VE user processes through the corresponding view of the VE user dedicated private area, and the VE user's private file or directory file comprises metadata associated with the VE user that allows the VE user to access a selected shareable file without copying the selected shareable file into the VE user's private area.

12. The method of claim 11, further comprising:

receiving a VE user request to delete a selected private file stored in the dedicated private area, wherein the selected private file contains a link to a sharable file in a common file storage memory;

deleting the selected private file in response to the user request; and deleting a metadata attribute associated with the selected private file in response to the user request.

13. The method of claim 11, wherein the step of creating the dedicated private area further comprises creating a private file area associated with a selected set of the plurality of VE users.

14. The method of claim 11, further comprising creating the file metadata attributes for each link associated with a shareable file in the common file storage memory.

15. The method of claim 11, further comprising receiving a VE user request to access a selected shareable file and pointing to the selected shareable file in response to the VE user request.

16. The method of claim 11, further comprising:

receiving a user request to delete a selected shareable file; and deleting the link located in the VE user private file that is associated with the selected shareable file in response to the VE user request.

17. The method of claim 11, further comprising:

receiving a VE user request to delete a selected private file stored in the dedicated private area, wherein the selected private file does not contain a link; and deleting the selected private file in response to the VE user request.

18. A non-transitory computer useable storage media comprising computer readable code for executing on a processor for implementing the steps of claim 11.

* * * * *